(12) United States Patent
Ceroll et al.

(10) Patent No.: US 9,993,936 B2
(45) Date of Patent: Jun. 12, 2018

(54) CHOP SAW WITH IMPROVED STORAGE MODE

(71) Applicant: Black & Decker Inc., New Britain, CT (US)

(72) Inventors: Warren A. Ceroll, Owings Mills, MD (US); Danielle J. Barker, Baltimore, MD (US); James D. Schroeder, Dallastown, PA (US); Stephanie A. Billingsley, Seven Valleys, PA (US); John C. Wenig, Bel Air, MD (US); Dennis A. Bush, Dillsburg, PA (US); Daniel Fitzgerald, Parkville, MD (US); Thomas J. Bodine, Glenwood, MD (US); Robert A. Usselman, Forest Hill, MD (US); Eric J. Samuelsen, Stewartstown, PA (US)

(73) Assignee: Black & Decker Inc., New Britain, CT (US)

( * ) Notice: Subject to any disclaimer, the term of this patent is extended or adjusted under 35 U.S.C. 154(b) by 104 days.

(21) Appl. No.: 15/053,339

(22) Filed: Feb. 25, 2016

(65) Prior Publication Data

US 2016/0279822 A1    Sep. 29, 2016

Related U.S. Application Data

(60) Provisional application No. 62/137,281, filed on Mar. 24, 2015.

(51) Int. Cl.
*B23D 45/04*    (2006.01)
*B27G 19/02*    (2006.01)
(Continued)

(52) U.S. Cl.
CPC .............. *B27B 5/29* (2013.01); *B23D 45/044* (2013.01); *B23D 59/002* (2013.01); *B27G 19/02* (2013.01)

(58) Field of Classification Search
CPC ...... B23D 45/044; B23D 59/002; B27B 5/29; B27G 19/02; Y10T 83/7788; Y10T 83/7705; Y10T 83/7697; Y10S 83/01
See application file for complete search history.

(56) References Cited

U.S. PATENT DOCUMENTS

| | | | |
|---|---|---|---|
| 5,184,534 A * | 2/1993 | Lee | B23Q 11/00 30/391 |
| 8,485,078 B2 * | 7/2013 | Janson | B23Q 11/06 83/399 |

(Continued)

FOREIGN PATENT DOCUMENTS

| | | |
|---|---|---|
| CN | 102886566 A | 1/2013 |
| EP | 1415744 A2 | 5/2004 |
| EP | 2774731 A1 | 9/2014 |

OTHER PUBLICATIONS

David Chariot, Extended European Search Report, dated Jul. 26, 2016, The Hague.

(Continued)

*Primary Examiner* — Stephen Choi
(74) *Attorney, Agent, or Firm* — Adan Ayala

(57) ABSTRACT

A chop saw includes a base assembly and a saw assembly pivotally attached to the base assembly. The base assembly has a workpiece-supporting plane. The saw assembly has a blade and a motor driving the blade. A hinged connection between the base assembly and a saw assembly allows a user to rotate the saw assembly from a position where the plane of the blade extends through the workpiece-supporting plane to a position where the plane of the blade does not extend through the workpiece-supporting plane. In such position, (Continued)

the plane of blade may be substantially parallel to the workpiece-supporting plane. A switch or sensor may detect when the saw assembly is in the pivoted position so that the motor cannot be activated in such position.

6 Claims, 6 Drawing Sheets

(51) Int. Cl.
    *B27B 5/29*     (2006.01)
    *B23D 59/00*     (2006.01)

(56) References Cited

U.S. PATENT DOCUMENTS

| | | |
|---|---|---|
| 2007/0205665 A1 | 9/2007 | Kawano et al. |
| 2014/0251106 A1* | 9/2014 | Gehret ................ B23D 45/044 83/471.3 |
| 2016/0221210 A1* | 8/2016 | Lin ....................... B27G 19/02 |

OTHER PUBLICATIONS

Annex to the European Search Report on European Patent Application No. EP 16158600, dated Jul. 14, 2016.

\* cited by examiner

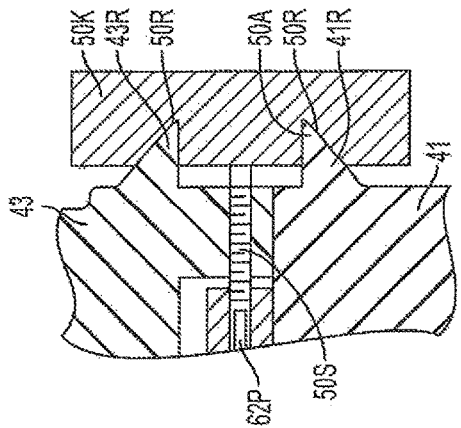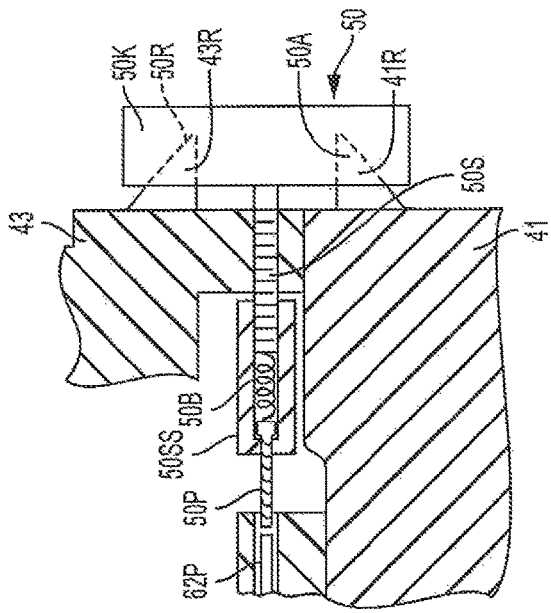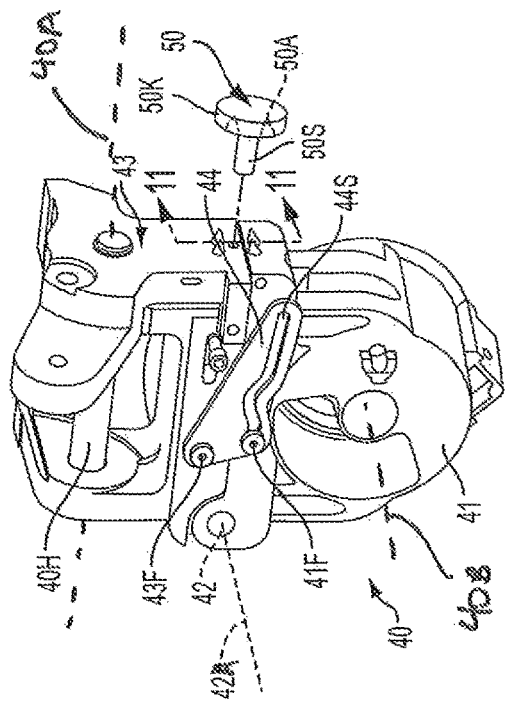
FIG. 2B
FIG. 2C
FIG. 2A

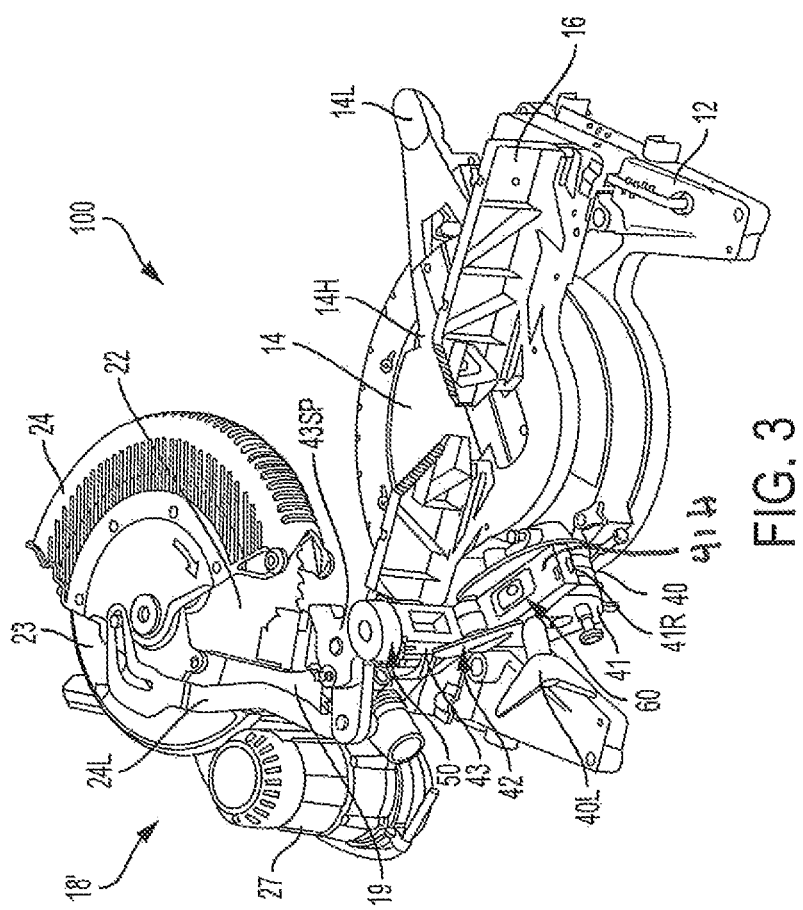

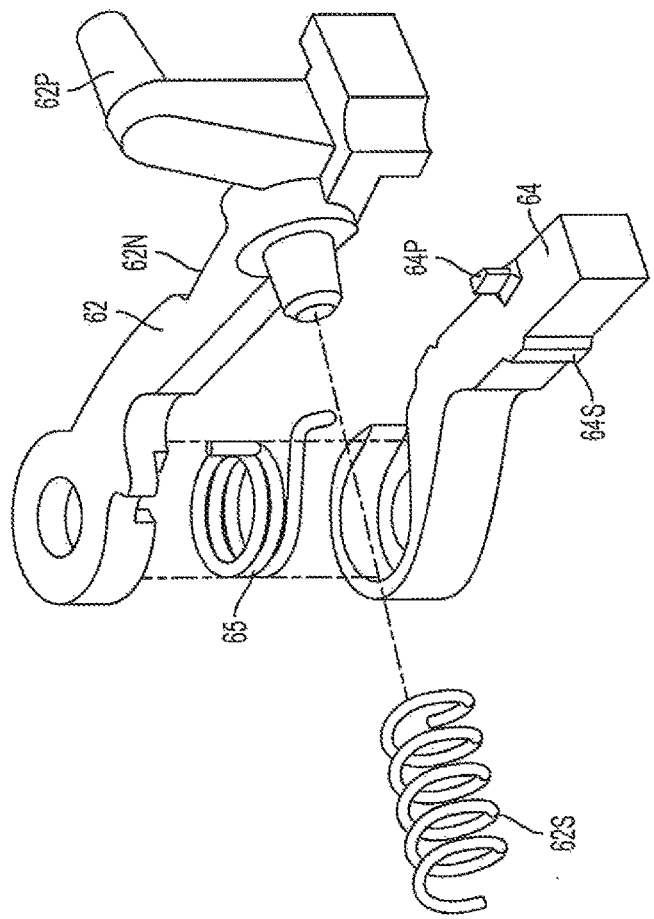
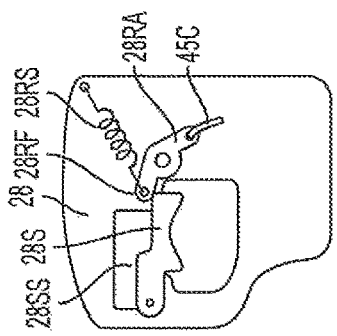
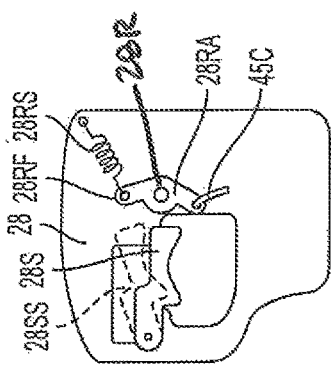
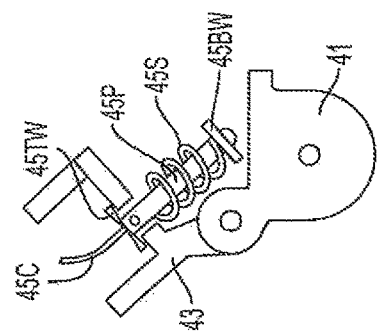
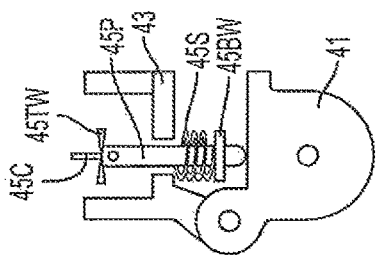

CHOP SAW WITH IMPROVED STORAGE MODE

CROSS-REFERENCE TO RELATED APPLICATION

The present application derives priority from U.S. Patent Application No. 62/137,281, filed Mar. 24, 2015, which is fully incorporated herein by reference.

FIELD OF THE INVENTION

The present invention relates to chop saws, and in particular, to a chop saw with an improved storage mode.

BACKGROUND

Chop saws and miter saws are commonly found on jobsites because of their versatility and ability to make cuts that other power tools cannot make quickly. Typically a chop saw has a base assembly and a saw assembly attached to the base that can be lowered into a cutting position. One such chop saw illustrated in U.S. Pat. No. 6,272,960, which is fully incorporated herein by reference.

A miter saw is a chop saw that has a rotatable table in its base assembly for allowing miter cuts. Some miter saws, such as the one illustrated in U.S. Pat. No. 5,297,463, which is fully incorporated herein by reference, have a beveling saw assembly, which allows bevel cuts, i.e., inclined cuts relative to the workpiece-supporting plane of the base assembly and/or table. In addition, in some miter saws, the saw assembly may beveled rightwardly and leftwardly from a zero-bevel position, i.e., 90 degrees relative to the workpiece-supporting plane. One such chop saw illustrated in U.S. Pat. No. 7,252,027, which is fully incorporated herein by reference.

BRIEF DESCRIPTION OF THE DRAWINGS

FIGS. 1A-1B are front perspective views of the chop saw with the table rotated in first and second positions, respectively.

FIG. 2A is a perspective view of a top trunnion hinge in a closed position.

FIG. 2B is a cross-section of a first embodiment of a locking handle along line II-II of FIG. 2A.

FIG. 2C is a cross-section of a second embodiment of a locking handle along line II-II of FIG. 2A.

FIG. 3 illustrates the chop saw of the present invention with the top trunnion hinge in an opened position.

FIGS. 7A-7C illustrates an alternate embodiment of the switch mechanism of FIG. 5, where FIGS. 7A-7B are top plan views in different positions, and FIG. 7C is an exploded view of components of the switch mechanism.

FIGS. 8A-8D illustrate a lockout mechanism, where FIGS. 8A-8B are a top plan view of the handle and a schematic rear view of the trunnion, respectively, when the trunnion is in the closed position, and FIGS. 8C-8D are a top plan view of the handle and a schematic rear view of the trunnion, respectively, when the trunnion is in the open position.

DESCRIPTION

Figure 1B:
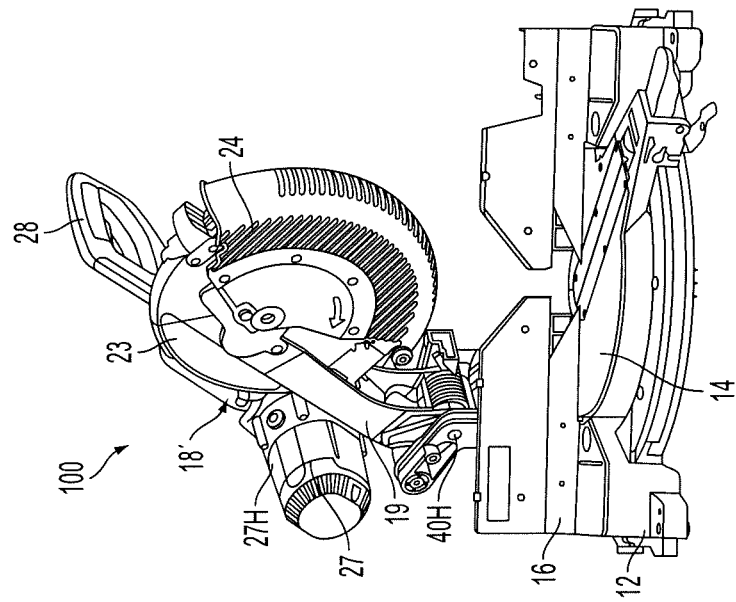
FIGS. 1A-1B illustrates the chop saw of the present invention in an operating position, where
Figure 1A:
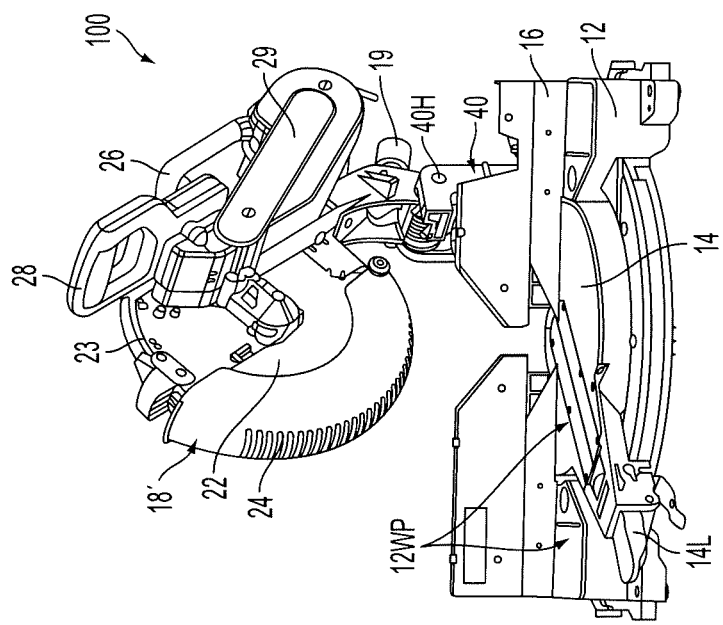

FIGS. 1A-1B illustrates a chop saw 100, such as the chop saw 100 described in US Patent Publication No. 2014/0251106, filed on Mar. 8, 2013, which is hereby fully incorporated by reference. Chop saw 100 has a base assembly 12, which may include a rotatable table 14. A fence assembly 16 is connected to base assembly 12.

Saw assembly 18' is preferably pivotally attached to table 14. Saw assembly 18' includes a trunnion 40 which is preferably rotatably connected to table 14. Trunnion 40 carries a hinge 40H. A pivot arm 19 is pivotably attached to hinge 40H. Pivot arm 19 may support a motor 27 in a housing 27H. Motor 27 may be operably connected to a blade 22 for driving blade 22. A transmission 29 may connect motor 27 to blade 22.

An upper portion of blade 22 may be covered by an upper guard 23, which is preferably supported by pivot arm 19. A movable lower guard 24 may be rotatably attached to upper guard 23. Lower guard 24 covers a lower portion of blade 22 until the pivot arm 19 (and thus saw assembly 18') is moved downwardly in a chopping action. A linkage (not shown) moves lower guard 24 to expose the lower portion of blade 22 for cutting a workpiece.

Chop saw 100 has a handle 28 for lowering pivot arm 19 (and thus saw assembly 18') in the chopping action. Typically handle 28 has a switch 28S for turning chop saw 100 on and off. In addition, chop saw 100 may have a carrying handle 26.

With such arrangement, the user can change the cutting plane, i.e., the plane of blade 22, relative to the plane of fence assembly 16 by rotating table 14 (and thus saw assembly 18') relative to base assembly 12, i.e., mitering the saw assembly 18'. The user can fix the rotational position of table 14 by engaging a miter lock assembly 14L, which is well known in the art.

The user may also change the cutting plane relative to the workpiece-supporting plane of base assembly 12 and/or table 14 by rotating the trunnion 40 (and thus saw assembly 18') relative to table 14, i.e., beveling the saw assembly 18'. The user can fix the rotational position of trunnion 40 by engaging a bevel lock assembly (not shown), which is well known in the art.

Referring to FIGS. 1A-3, trunnion 40 preferably has a trunnion body 41 with a top trunnion hinge 42. A top trunnion 43 is pivotally attached to top trunnion hinge 42. Preferably trunnion body 41 has a substantially horizontal surface 41H which supports top trunnion 43. Top trunnion 43 in turn carries hinge 40H.

Top trunnion 43 can be rotated relative to trunnion body 41 about top trunnion hinge 42. This would allow a user to rotate saw assembly 18' from a position where the plane of blade 22 extends through table 14 for cutting (i.e., top trunnion 43 is in the closed position of FIGS. 2A-2B and saw assembly 18' is in the operating position of FIGS. 1A-1B) to a position where the plane of blade 22 does not extend through table 14 (i.e., top trunnion 43 is rotated away from trunnion body 41 to the opened position shown in FIG. 3). Persons skilled in the art will recognize that, in such position, the plane of blade is substantially parallel to the workpiece-supporting plane of base assembly 12 and/or table 14.

Persons skilled in the art will recognize that top trunnion 43 will rotate about an axis 42A that is preferably on a parallel plane to the workpiece-supporting plane of base assembly 12 and/or table 14. Axis 42A may also be substantially perpendicular to the axis 40A of hinge 40H, and substantially parallel to the bevel axis 40B.

A locking handle 50 is preferably provided to maintain top trunnion 43 in proximity with trunnion body 41. Locking handle 50 may have a shaft 50S threadingly engaged to trunnion body 41 and/or top trunnion 43, and a knob 50K with an arcuate channel 50A.

Referring to FIG. 2B, trunnion body 41 and top trunnion 43 preferably have respective ramps 41R, 43R. Channel 50A preferably has a ramp 50R that can contact ramps 41R, 43R.

With such arrangement, as knob 50K is rotated, shaft 50S is threaded further into trunnion body 41 and/or top trunnion 43. Channel 50A is brought closer towards ramps 41R, 43R. As ramp 50R contacts ramps 41R, 43R, any play is taken up between trunnion body 41, top trunnion 43 and locking handle 50, providing a solid connection therebetween.

FIG. 2C illustrates an alternate locking handle 50, where like numerals refer to like parts. A sleeve 50SS may be threadedly engaged or pressed into shaft 50S. A plunger 50P may be disposed and captured within sleeve 50SS. A spring 50B may be disposed between plunger 50P and shaft 50S biasing the plunger 50P outwardly towards protrusion 62P. Persons skilled in the art will recognize that plunger 50P does not escape sleeve 50SS as it is preferably captured therewithin.

Such arrangement ensures that plunger 50P does not push protrusion 62P too far, which could damage switch 63. Persons skilled in the art shall recognize that such result is possible as plunger 50P can move towards shaft 50S when the user continues to rotate knob 50K, even after protrusion 62P has bottomed out.

Persons skilled in the art shall recognize that sleeve 50SS retains knob 50K, so that it cannot be removed from top trunnion 43.

Figure 5:
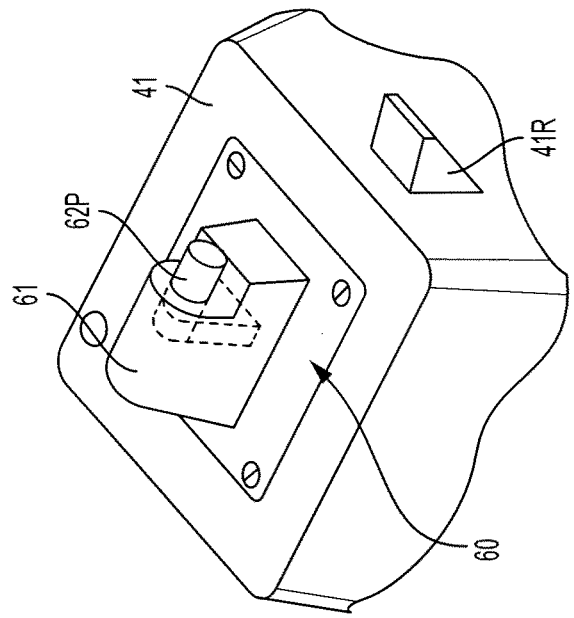
FIG. 5 is a perspective of a switch mechanism enclosed in the top trunnion hinge.
Figure 4:
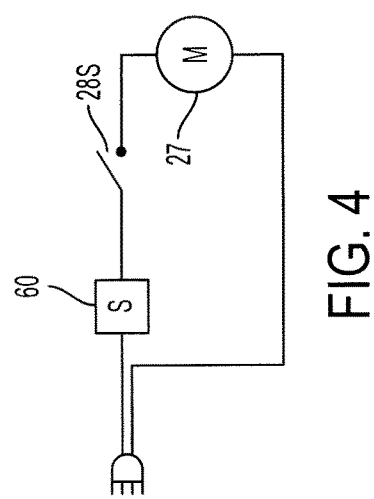
FIG. 4 is a circuit schematic for the chop saw of FIGS. 1A-1B and 3.

It is advantageous to provide a mechanism to prevent the user from turning on or activating chop saw 100 when the top trunnion 43 is in the opened position of FIG. 3, and/or in a not fully locked closed position of FIGS. 2A-2B. Such mechanism is shown in FIGS. 4-5, where a switch mechanism 60 is disposed in series with the handle switch 28S and motor 27. Preferably switch mechanism 60 acts as a normally-opened momentary switch.

Switch mechanism 60 may be disposed in a cavity within trunnion body 41. However persons skilled in the art will recognize that switch mechanism 60 may be disposed in a cavity within top trunnion 43, or any other positions on chop saw 100 where the proximity of top trunnion 43 to trunnion body 41 can be detected.

Figure 6:
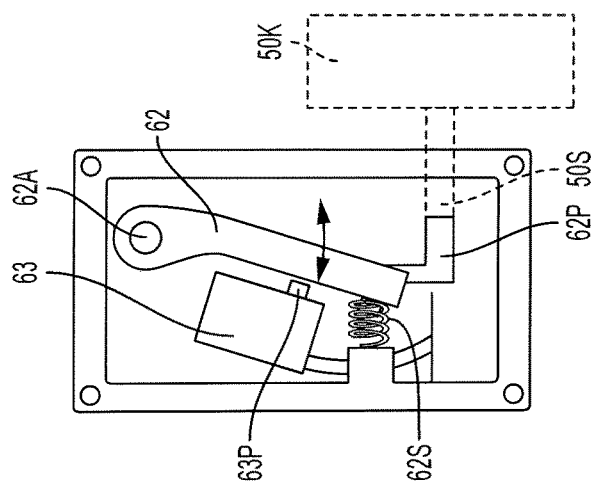
FIG. 6 is a top plan view of the switch mechanism of FIG. 5.

Switch mechanism 60 may have a cover 61 to substantially cover the different components of switch mechanism 60. Referring to FIGS. 2B and 5-6, switch mechanism 60 may have a switch 63, and a first lever 62 pivotally attached to trunnion body 41 about pivot 62A. A spring 62S may bias first level 62 away from switch 63.

First level 62 may have a protrusion 62P that extends beyond cover 61. Protrusion 62P may be contacted by shaft 50S. As the user rotates knob 50K, shaft 50S moves further into switch mechanism 60, depressing protrusion 62P. Such movement causes first lever 62 to rotate about pivot 62A. First level 62 may contact switch plunger 63P, closing the circuit of FIG. 4, enabling use of chop saw 100. Persons skilled in the art will recognize that, if switch mechanism 60 is disposed on top trunnion 43, it may be preferable to threadingly engage shaft 50S unto trunnion body 41, to ensure that shaft 50S depresses protrusion 62P when top trunnion 43 is in the closed position of FIGS. 2A-2B.

Persons skilled in the art shall recognize that first lever 62 may be made of a soft material to provide compliance and bend when contacting plunger 63P, rather than exerting a full amount of force against plunger 63P.

It may advantageous to provide a switch mechanism that allows first level 62 to travel farther than the travel range of plunger 63P, without damaging switch 63. Such alternative switch mechanism 60 is shown in FIGS. 7A-7C, where like numerals refer to like parts.

Like before, first lever 62 may be pivotally attached to trunnion body 41 about pivot 62A, and may have a protrusion 62P that extends beyond cover 61. Protrusion 62P may be contacted by shaft 50S. A spring 62S may bias first lever 62 away from switch 63.

A second lever 64 may be disposed under first lever 62. A coil spring 65 may be disposed between first and second levers 62, 64 in order to bias first lever 62 towards second lever 64. A protrusion 64P on second lever 64 may engage a notch 62N in first lever 62 to prevent first lever 62 from over-rotating away from switch 63 beyond second lever 64.

Figure 7A:
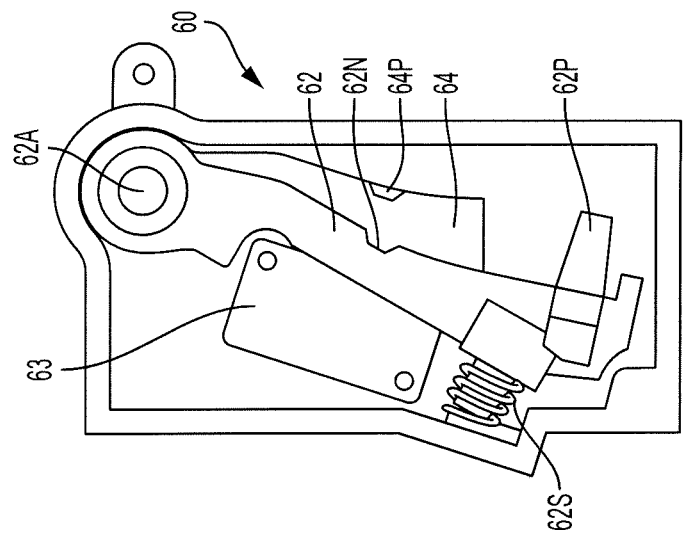
Figure 7B:
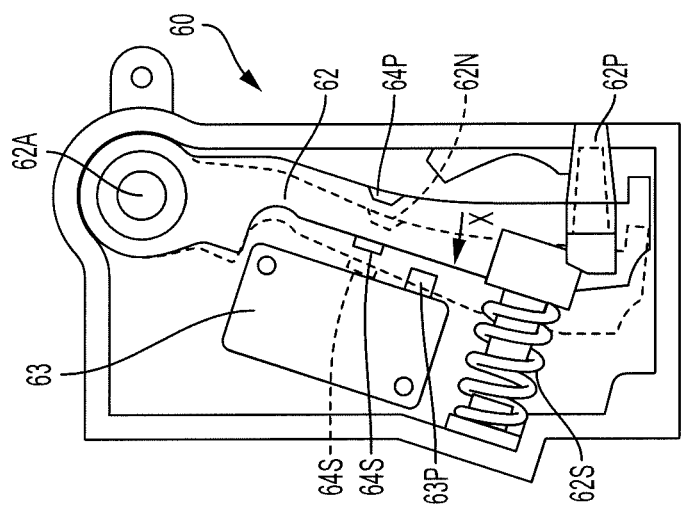

FIG. 7A shows the first and second levers 62, 64 in a neutral position (shown in solid lines) before shaft 50S contacts protrusion 62P. When shaft 50S contacts protrusion 62P, it can rotate first and second levers 62, 64 along direction X towards switch 63, until second lever 64 depresses plunger 63P. Persons skilled in the art will recognize that, while shaft 50S does not contact second lever 64, second lever 64 moves along with first lever 62 due to the biasing force of spring 65.

If shaft 50S continues to move first lever 62 towards switch 63, second lever 64 will continue moving towards switch 63 until the housing of switch 63 is contacted by a stop protrusion 64S on second lever 64. Such position is shown in broken lines in FIG. 7A. When such contact occurs, second lever 64 will not rotate any further along direction X. Persons skilled in the art will recognize limiting motion of second lever 64 will result in limiting the amount of force exerted on plunger 63P. First lever 62 however can continue moving along direction X without exerting any further force on plunger 63P, as first lever 62 can move beyond switch 63, as shown in FIG. 7B.

Persons skilled in the art will recognize that switch mechanism 60 could be replaced with other types of electric sensors, such as Hall effects sensors, magnetic sensors, light sensors, proximity sensors, relays, etc. to detect the proximity or separation of top trunnion 43 relative to trunnion body 41. As with switch mechanism 60, such sensors would prevent the user from turning on chop saw 100 when the top trunnion 43 is in the opened position of FIG. 3.

FIGS. 8A-8D illustrate another mechanism to prevent the user from turning on or activating chop saw 100 when the top trunnion 43 is in the opened position of FIG. 3. Handle 28 preferably has an on/off switch trigger 28S, which can be pivoted to contact a switch 28SS.

In addition, handle 28 may carry a rocker 28R which is pivotably attached to handle 28. Rocker 28R may have a first arm 28RF connected to a spring 28RS, which in turn is attached to handle 28 to bias rocker 28R towards the position shown in FIG. 8A. Rocker 28R may have a second arm 28RA, which in turn is connected to a flexible wire or cable 45C.

At its other end, cable 45C may be connected to a plunger 45P. Plunger 45P preferably extends through top trunnion 43 and can contact trunnion body 41.

A bottom washer 45BW may be attached to the plunger 45P. A spring 45S may be disposed between top trunnion 43 and bottom washer 45BW to bias plunger 45P towards trunnion body 41. A top washer 45TW may be also be attached to the plunger 45P to capture plunger 45P within top trunnion 43.

With such arrangement, when the top trunnion 43 and trunnion body 41 are in the closed position of FIG. 8B, the plunger 45P will be pushed upwardly away from trunnion body 41. In such position, plunger 45P is not pulling on cable 45W. Therefore the spring 28RS pulls rocker 28R towards the position shown in FIG. 8A. In this position, rocker 28R cannot interfere with the pivoting of on/off switch trigger 28S, thus allowing the user to turn on and operate chop saw 100.

Referring to FIGS. 8C-8D, if the user pivots top trunnion 43 relative to trunnion body 41 in order to store chop saw 100, plunger 45P will no longer contact trunnion body 41. Spring 45S will force plunger 45P away from top trunnion 43. Such movement will also pull cable 45C, causing rocker 28R to rotate into the position shown in FIG. 8C. In such position, first arm 28RF will contact on/off switch trigger 28S. Such contact will prevent the user from rotating on/off switch trigger 28S and thus preventing the user from turning on and operating chop saw 100.

The description of the invention is merely exemplary in nature and, thus, variations that do not depart from the gist of the invention are intended to be within the scope of the invention. Such variations are not to be regarded as a departure from the scope of the invention.

What is claimed is:

1. A chop saw comprising:
a base assembly having a workpiece-supporting plane;
a saw assembly pivotally attached to the base assembly, the saw assembly having a blade having a blade plane and a motor driving the blade;
a trunnion connecting the base assembly and the saw assembly allowing a user to rotate the saw assembly from a first position where the blade plane extends through the workpiece-supporting plane to a second position where the blade plane does not extend through the workpiece-supporting plane, the trunnion comprising a trunnion body connected to the base assembly, and a top trunnion pivotally connected to the trunnion body;
a switch disposed in the trunnion, the switch allowing current to activate the motor when the trunnion body in proximity with the top trunnion; and
a locking handle engaged to the trunnion for maintaining the trunnion body in proximity with the top trunnion;
wherein the locking handle contacts the switch in order to allow current to activate the motor.

2. The chop saw of claim 1, wherein the switch is disposed within at least one of the trunnion body and top trunnion.

3. The chop saw of claim 2, further comprising a lever with a protrusion.

4. The chop saw of claim 3, wherein the locking handle contacts the protrusion, causing the switch to be activated.

5. The chop saw of claim 1, wherein the blade plane is substantially parallel to the workpiece-supporting plane in the second position.

6. The chop saw of claim 1, wherein the trunnion can be rotated about a bevel axis that is substantially parallel to the workpiece-supporting plane.

* * * * *